Jan. 14, 1964 S. E. MILLER 3,118,111
PULSE SYNCHRONIZING MEANS FOR MULTIROUTE P.C.M. SYSTEM
Filed Dec. 1, 1960
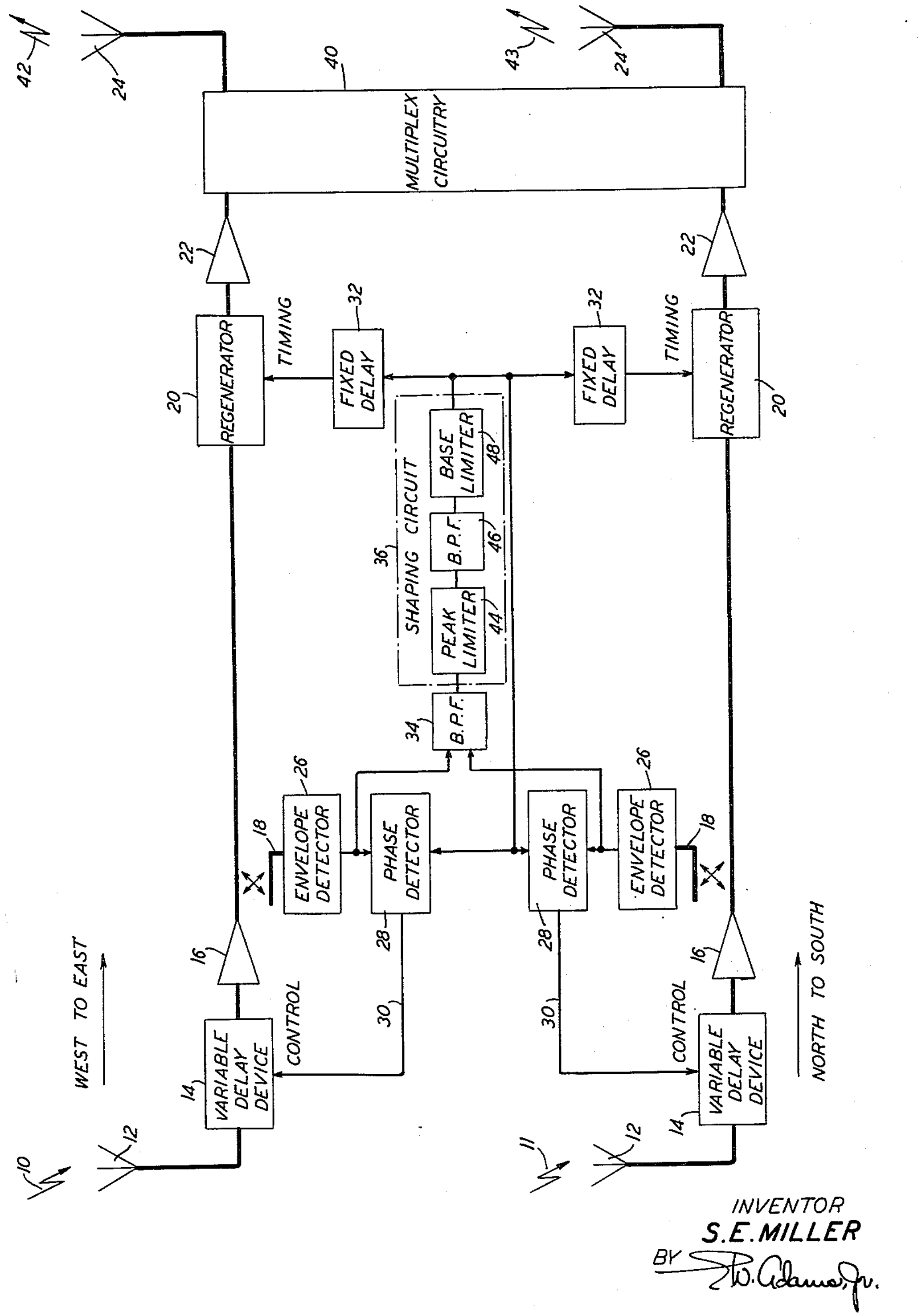
INVENTOR
S. E. MILLER
BY [signature]
ATTORNEY 3,118,111
PULSE SYNCHRONIZING MEANS FOR MULTIROUTE P.C.M. SYSTEM Stewart E. Miller, Middletown, N.J., assignor to Bell Telephone Laboratories, Incorporated, New York, N.Y., a corporation of New York Filed Dec. 1, 1960, Ser. No. 73,104
9 Claims. (Cl. 325—13)

This invention relates to the derivation of timing pulses in pulse communication systems and more particularly to the derivation at points of intersection in multiroute pulse modulation systems of timing pulses suitable for use in reducing the signals of the intersecting routes to a common time base.

A complex cross country communication system having intersecting signal routes must be capable of transferring information from one route to another at the intersecting stations. For example, it may be desired to transmit information from Chicago to Philadelphia. If a facility exists for transmitting information from Chicago to New York and another from New York to Philadelphia, employing these facilities and transferring the information at New York obviates the need for a direct route from Chicago to Philadelphia. By practicing this principle in an extended cross country system the number of direct routes required between points is greatly diminished.

Pulse modulation communication systems are no exception to the general rule insofar as information transfer at intersecting stations is concerned. Pulse signals of a large number of information channels are usually multiplexed on a single communication route on a time basis. At the intersecting stations or branching points the pulses from the channels carried on the various routes are interleaved with one another, or substituted one for the other, effecting a transfer of information from route to route.

In an actual system the pulse signals on the intersecting routes encounter widely different conditions in traveling to the branching point and consequently may be expected to occur asynchronously at the branching point. These signals, therefore, must first be brought into synchronism or reduced to a common time base prior to being interleaved. Heretofore, synchronism has been achieved by retiming all the signals carried on the various intersecting routes with respect to a single set of timing pulses usually derived from a portion of the signal on an arbitrarily chosen one of the intersecting routes by frequency selection of the basis pulse repetition frequency thereof.

Such systems are inherently subject to the disadvantage that failure of the signal route upon which the arbitrarily chosen pulse information signal is carried incapacitates the entire retiming operation at the branching point.

Moreover, although the timing pulses follow in phase the pulses carried on the chosen route, this is not true of the pulse signals on the other intersecting routes. Misalignment, i.e., difference between the time of occurrence of the timing and information pulses, may become excessive if the signals from the chosen route deviate greatly in phase from those of the other intersecting routes. This gives rise to possible errors in retiming in that spurious pulses may be created or information pulses destroyed.

It is, therefore, the object of the present invention to derive a set of timing pulses in a multiroute pulse communication system whose existence is indifferent to failure of any of the individual routes and to realize improved alignment of such pulses with respect to the signal pulses carried on the individual routes.

In accordance with the above object, the timing scheme of the present invention derives a single set of timing pulses by frequency selection from the combination of portions of pulse information signals from all the intersecting routes. The contribution of signals from all the routes in deriving a set of timing pulses insures the continuation of the retiming operation despite the cessation of signals on any individual routes. Furthermore, since the pulse signals from all the intersecting routes contribute to the phase characteristics of the set of derived timing pulses, these timing pulses are more closely aligned with the information pulse signals and hence the possibility of excessive misalignment between timing pulses and any of the individual pulse information signals is markedly reduced.

More specifically portions of the pulse signals carried on the individual routes are abstracted from the routes and applied in parallel to a band-pass filter. The band-pass filter selects the component of the basic repetition frequency of each pulse information signal, and these components add to form a composite signal which may be shaped into a set of timing pulses, representative in phase of the information signals from all the intersecting routes. Utilization circuits individual to each route retime the pulse signal thereon under the control of the unitary set of timing pulses. At this point the pulse information signals of the various routes occur in synchronism and hence are amenable to interleaving.

As an additional feature to improve alignment between signal and timing pulses, variable delay devices individual to each signal route control the delay introduced into each route prior to the application of signals therein to any combining or utilization circuit. An error signal is developed for each route which is indicative of the phase discrepancy between the timing pulses and the signal pulses on that route. This signal is employed to control the delay introduced into its associated signal route by the variable delay device.

The above and other features of the invention are considered in detail in the following specification taken in conjunction with the drawing, the single figure of which delineates a branching point repeater illustrating the features of the present invention.

The branching point repeater of the figure is adapted to receive radio frequency pulse information signals. More specifically the signals might be pulse code modulated information from a plurality of channels all time multiplexed onto one radio frequency signal route for the purpose of radio transmission. The present invention may be practiced, however, with equal success in a baseband pulse code system. Signals 10 from a route traveling west to east and signals 11 from a route traveling north to south are intercepted by antennas 12 constituting the first stages of identical radio frequency signal paths shown in the figure as heavy lines. The intercepted signals 10, considering the west to east signal path as exemplary of both signal paths, are applied to a variable delay device 14, to be described in more detail subsequently, and thereafter to an amplifier 16. A directional coupler 18 abstracts a portion of the radio frequency signal from the output of amplifier 16. The remainder of the output of amplifier 16 is applied to the input of a regenerator 20.

An envelope detector 26 demodulates the radio frequency signal abstracted by directional coupler 18. The baseband pulses developed by envelope detector 26 are applied to a high Q, band-pass filter 34, tuned to the basic pulse frequency of the system, together with similar pulses abstracted from the other radio frequency signal path. Bandpass filter 34 selects and transmits the components of the basic pulse frequency of the signals applied thereto. These basic pulse frequency components add at the output of bandpass filter 34 to form a composite timing wave. The basic pulse frequency as referred to herein is the number of pulses which would occur per second if a pulse were present in each time position of the pulse coded signal.

Since the signals from both routes are utilized in deriving the timing pulses, failure of signals upon either route does not interrupt the timing operation at the branching point repeater. The composite timing wave is applied to a shaping circuit 36 which forms pulses to satisfy the system requirements.

In many radio frequency pulse code systems, for instance, it is found desirable to derive timing pulses having a raised "cosine" shape. To perform this function, shaping circuit 36 could comprise a peak limiter 44, a low-Q, band-pass filter 46 and a base limiter 48 connected in tandem. The peak limiter removes any amplitude variations from the composite timing wave and filter 46 eliminates the harmonics generated by the limiting operation. A base limiter develops raised cosine pulses from the output of band-pass filter 46. Examples of possible circuits which might be employed as limiters 44 and 48 are illustrated in section 4–3 of "Pulse and Digital Circuits" by Millman and Taub, McGraw-Hill Book Company, Inc., 1956.

The resultant set of timing pulses emanating from shaping circuit 36 is applied to regenerator 20 through a fixed delay 32. The purpose of fixed delay 32 is to align the centers of the timing pulses and the signal pulses applied to regenerator 20 on a steady-state basis.

Timing pulses are applied to regenerator 20 to control the retiming of the radio frequency signal pulses traversing the radio frequency signal path. Patent 2,868,965 which issued January 13, 1959 to O. E. DeLange discloses a regenerator which may be advantageously employed as regenerator 20. The regenerated radio frequency pulse signals are amplified in an amplifier 22 after which they are introduced to appropriate multiplex circuitry indicated by a block 40.

As described in connection with the west to east signal 10, the north to south signal 11 also traverses the radio frequency signal path to which it is assigned and is applied to multiplex circuitry 40. Because a common set of timing pulses was employed to retime the information signals of both routes, the pulse signals on the routes occur in synchronism and hence, signals from channels on the west to east route may be interleaved with or substituted for the signals from the channels on the north to south route, and vice versa, to bring about a transfer of information at the branching point.

The regrouped multiplex signals are applied to their respective signal paths from which they, as represented by a west to east signal 42 and a north to south signal 43, are radiated by output antennas 24.

The timing wave emanating from band-pass filter 34 is a sine wave oscillating at the basic pulse frequency of the system and having a phase relative to the pulse code signals transmitted on the intersecting routes which is the average of the phase difference between the basic pulse frequency components of the information signals carried on the contributing routes. This fact is evidenced by consideration of the well-known trigonometric relationship which dictates that the sum of two sine waves having the same frequency but differing in phase is a sine wave having the same frequency as the addend sine waves but a phase relative to the addend sine waves which is half the phase difference of the addend sine waves. See "College Algebra and Trigonometry" by Frederic H. Miller, John Wiley and Sons, Inc., 1945 at Chapter 6, Article 39, Equation (7) for a symbolic representation of this trigonometric identity. Hence, there is a limitation upon the system that the basic pulse frequency of the pulse signals on the contributing routes must be identical.

The principles of this invention may be extended to include any number of signal routes without losing the advantages enumerated for the exemplary embodiment. It should be noted, however, that if a timing wave which has a properly weighted average or arithmetic mean phase is desired for some particular reason, the number of contributing routes should be an integral power of 2, that is, 2, 4, 8, 16, . . . etc.

By deriving the timing wave which is at worst "indicative" of the phase relation of the signals on all the routes, the alignment between the timing pulses and the information pulses from any of the individual routes is improved.

The alignment is further improved by a control circuit for applying variable delay to each radio frequency signal path by means of variable delay devices 14. Thus in each route, a portion of the demodulated pulse code signal emanating from envelope detector 26 is compared in phase with a portion of the set of timing pulses emanating from shaping circuit 36 in a phase detector 28 and a comparison signal developed. Control to variable delay device 14 is afforded by the phase comparison signal developed by phase detector 28.

The correction rendered by the variable delay control circuit may be considered to be of two types. First, it corrects for misalignment of information and timing pulses resulting from fast variations in pulse positions of the information pulses, called "time jitter." This misalignment occurs due to the slow response of band-pass filter 34 to jitter, and is a phenomenon found in prior art applications employing a band-pass filter to derive a timing wave from one information pulse signal. Second, the control circuit compensates for misalignment between timing pulses and the individual signal pulses which occur because of the fact that the timing pulses are not derived from the pulse signals on a single route but represent an average of the pulse signals from a plurality of signal routes. This is, of course, characteristic of the application of a band-pass filter found in the present invention.

By way of example, the function of variable delay device 14 and amplifier 16 could be carried out with a traveling wave tube. The control in this case would be applied to the helix element of the traveling wave tube to effect a change in the helix-to-cathode potential and hence vary the delay experienced by the radio frequency signal while traversing the traveling wave tube. A more detailed description of the operation of this circuit may be had by reference to the copending application of W. M. Goodall, Serial No. 70,219, filed November 18, 1960, now Patent No. 3,085,200, assigned to the assignee of the present application.

Also by way of example phase detector 28 might conveniently be as illustrated in FIGS. 12–14 of "Electronic Instruments," Radiation Laboratory Series, volume 21, McGraw-Hill Book Company, Inc., 1948. If this circuit were employed the envelope detector output could be applied as the error signal and the timing pulses as the reference voltage.

What is claimed is:

1. In a multiroute communication system, a plurality of signal routes, each carrying pulse information signals, means for obtaining a sample of the information pulses carried by each of said routes, a frequency selective device having a band-pass characteristic related to a chosen repetitive characteristic of said signals, means for applying said samples to said frequency selective device, means for shaping the output of said frequency selective device into timing pulses, utilization circuits individual to each of said routes and tandemly connected therewith, and means for applying said timing pulses to said utilization circuits to govern timing operations thereat.

2. A multiroute communication system as defined in claim 1 wherein the information pulses carried on said signal routes each have a basic repetition frequency of $f_0$ and said frequency selective device is tuned to the frequency $f_0$.

3. In a communication system, a plurality of signal routes, each carrying pulse information signals, means for obtaining a sample of the information pulses carried by each of said routes, a band-pass filter tuned to the basic repetition frequency of said signals, means for applying each of said samples to said band-pass filter, means for shaping the output of said band-pass filter to form a set of timing pulses, a utilization circuit individual to each of said routes and tandemly connected therewith, means for applying said timing pulses to said utilization circuits to govern timing operations thereat, a variable delay device individual to each of said routes and tandemly connected therewith ahead of said utilization circuit, means for comparing the phase of said timing pulses with said sample from each of said routes to develop individual control signals representative of the misalignment of the information signals carried on each of said routes, and means for applying each of said control signals to its respective delay device to control the delay introduced into that signal route in order to bring the information pulses applied to said utilization circuits into closer alignment with said timing pulses.

4. In a self-timed regenerative repeater, apparatus for reducing pulse information signals carried by a plurality of signal routes to a common time base, said apparatus comprising means for obtaining a sample of the information pulses transmitted on each of said routes, a frequency selective device having a band-pass characteristic related to a chosen repetitive characteristic of said signals, means for applying each of said samples simultaneously to said frequency selective device, means for shaping said frequency selective device output to form timing pulses, a pulse regenerator individual to each of said routes and tandemly connected therewith, and means for applying said timing pulses to each of said regenerators to control the retiming of the pulse information signals applied thereto.

5. A regenerative repeater as defined in claim 4 in which the basic pulse repetition frequency of the information pulses carried by each of said routes is $f_0$ and said frequency selective device is tuned to $f_0$.

6. A self-timed regenerative repeater for regenerating radio frequency pulse information signals carried by at least two signal routes to occur in phase synchronization comprising means for sampling the radio frequency signals being transmitted on each of said routes, means for demodulating each of said samples, a band-pass filter tuned to the basic repetition frequency of said signals, means for applying said demodulated samples to said band-pass filter, means for shaping said band-pass filter output into a set of timing pulses, a radio frequency pulse regenerator individual to each of said routes and tandemly connected therewith, means for applying said timing pulses to each of said regenerators to control the retiming of radio frequency pulse signals applied thereto.

7. A self-timed regenerative repeater for regenerating at least two pulse information signals to occur in phase synchronization comprising a signal path for each of said signals including in order an input circuit, a variable delay device, a pulse regenerator for producing output pulses in response to input pulses, the time of occurrence and amplitude of said output pulses depending upon the time of occurrence of control pulses and the amplitude of said input pulses at said time of occurrence of said control pulses, respectively, and an output circuit, means for obtaining samples of the information pulses occurring at the output of said delay device in each of said paths, a band-pass filter tuned to the basic repetition frequency of said signals, means for applying said samples to said filter to derive a set of timing pulses, the phase of which represents the phases of said sample signals, means for applying said set of timing pulses to said regenerators, in each of said signal paths to control the retiming therein, means for comparing said set of pulses and said samples in each path to derive individual control quantities for the respective variable delay devices, and means for applying each of said control quantities to its respective delay device to control the delay introduced into said signal paths.

8. A self-timed regenerative repeater for relegating to a common time base pulse information signals carried by a plurality of signal routes comprising means for obtaining a sample of the information pulses being transmitted by each of said routes, a band-pass filter tuned to the basic repetition frequency of said signals, means for applying said samples to said band-pass filter, means for shaping said band-pass filter output to form a set of timing pulses, a pulse regenerator individual to each of said channels and tandemly connected therewith, means for applying said timing pulses to each of said regenerators to control the retiming of the pulse information signal applied thereto, a variable delay device individual to each of said routes and tandemly connected therewith ahead of said regenerator, means for developing a control signal for each of said routes representative of the phase difference between said sample from its respective route and said timing pulses, and means for applying each of said control signals to its respective delay device to control the delay introduced into that signal route in order to bring the information signals to be regenerated into alignment with said timing pulses.

9. In a multiroute communication system, a plurality of signal routes, said plurality being equal to an integral power of 2, each route carrying pulse information signals having the same basic repetition frequency, means for obtaining a set of timing pulses occurring at said basic repetition frequency and equal in phase to the average of each of said pulse information signals carried on said signal routes, utilization circuits individual to each of said routes and tandemly connected therewith, and means for applying said timing pulses to said utilization circuits to govern timing operations thereat.

References Cited in the file of this patent

UNITED STATES PATENTS 2,949,503 Andrews ______________ Aug. 16, 1960